(12) United States Patent
Sirke et al.

(10) Patent No.: US 11,524,546 B2
(45) Date of Patent: Dec. 13, 2022

(54) METHOD FOR OPERATING AN AIR SUSPENSION SYSTEM, AND AIR SUSPENSION SYSTEM

(71) Applicant: Continental Teves AG & Co. OHG, Frankfurt (DE)

(72) Inventors: Volkan Sirke, Hannover (DE); Stefan Mölle, Hildesheim (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 367 days.

(21) Appl. No.: 16/774,660

(22) Filed: Jan. 28, 2020

(65) Prior Publication Data

US 2020/0247210 A1     Aug. 6, 2020

(30) Foreign Application Priority Data

Feb. 5, 2019  (DE) ..................... 10 2019 201 444.5

(51) Int. Cl.
| | |
|---|---|
| *B60G 17/052* | (2006.01) |
| *B60G 11/30* | (2006.01) |
| *B60G 5/00* | (2006.01) |
| *F15B 1/08* | (2006.01) |

(52) U.S. Cl.
CPC .......... *B60G 17/0525* (2013.01); *B60G 5/00* (2013.01); *B60G 11/30* (2013.01); *B60G 17/0528* (2013.01); *F15B 1/08* (2013.01)

(58) Field of Classification Search
CPC ...... B60G 17/0525; B60G 5/00; B60G 11/30; B60G 17/0528; F15B 1/08
USPC ....... 280/124.157, 124.158, 124.159, 124.16
See application file for complete search history.

(56) References Cited

U.S. PATENT DOCUMENTS

| | | | |
|---|---|---|---|
| 3,736,003 A | 5/1973 | Ono | |
| 4,834,418 A | 5/1989 | Burna et al. | |
| 4,836,511 A | 6/1989 | Burna et al. | |
| 6,220,613 B1 * | 4/2001 | Franzini | B60G 21/06 280/5.506 |
| 6,679,504 B2 * | 1/2004 | Delorenzis | F16F 5/00 280/5.512 |
| 9,273,700 B2 * | 3/2016 | Bergemann | B60G 17/0523 |
| (Continued) | | | |

FOREIGN PATENT DOCUMENTS

| | | | |
|---|---|---|---|
| CN | 113246680 A | * | 8/2021 |
| EP | 1243447 A2 | | 9/2002 |

OTHER PUBLICATIONS

Search Report dated Oct. 14, 2019 from corresponding German Patent Application No. DE 10 2019 201 444.5.

*Primary Examiner* — Toan C To

(57) ABSTRACT

A method and system for operating pneumatic suspension system including a plurality of air springs changing a ride height of the motor vehicle by the supply and extraction of compressed air, at least two first axle air springs, and two second axle air springs, an air spring valve, a first and further changeover valve are arranged in a compressed air path, an additional accumulator valve, the second compressed air path is connected to the first compressed air path via a third compressed air path in which a connecting valve is provided, for simultaneous adjustment of the ride height of the vehicle on both axles, the air spring valves, and the first and the further changeover valves and the additional accumulator valve are opened at the same time while the connecting valve remains closed.

12 Claims, 2 Drawing Sheets

(56) References Cited

U.S. PATENT DOCUMENTS

| | | | | |
|---|---|---|---|---|
| 10,449,820 B2* | 10/2019 | Iyoda | ............... | F04B 35/04 |
| 10,759,249 B2* | 9/2020 | Ohashi | ............... | B60G 17/0523 |
| 10,960,724 B2* | 3/2021 | Meier | ............... | B60G 17/052 |
| 2002/0136645 A1 | 9/2002 | Folchert et al. | | |
| 2006/0049606 A1* | 3/2006 | Geiger | ............... | B60G 17/0523 |
| | | | | 280/124.157 |
| 2011/0316248 A1* | 12/2011 | Hein | ............... | B60G 17/0523 |
| | | | | 280/124.159 |
| 2013/0192681 A1* | 8/2013 | Meier | ............... | B60G 17/0565 |
| | | | | 137/613 |
| 2013/0195682 A1* | 8/2013 | Becher | ............... | F04B 7/02 |
| | | | | 417/307 |
| 2013/0255240 A1* | 10/2013 | Bergemann | ............... | F15B 1/02 |
| | | | | 60/413 |
| 2014/0333038 A1* | 11/2014 | Gocz | ............... | B60G 17/0528 |
| | | | | 280/124.16 |
| 2021/0178847 A1* | 6/2021 | Hein | ............... | B60G 11/27 |

* cited by examiner

METHOD FOR OPERATING AN AIR SUSPENSION SYSTEM, AND AIR SUSPENSION SYSTEM

CROSS REFERENCE TO RELATED APPLICATIONS

This application claims priority to German Patent Application No. DE 10 2019 201 444.5, filed Feb. 5, 2019, wherein the contents of such application is incorporated herein by reference.

Electronically controlled air suspension systems for ride height adjustment of a car have been known for a long time. The main components of the air suspension system are adjustable air springs which provide springing for the vehicle superstructure, and an air supply device which provides compressed air. These two components are connected together via pneumatic lines. Also, various sensors are provided, such as height and pressure sensors, and a control unit which can function as a control and evaluation device. Various switching valves are provided in the pneumatic lines, which are controlled by means of the control unit to assume different switching states (open/closed). It is understood that the sensors and the switching valves are connected to the control unit via electrical lines.

The air suspension system allows active control of the height/level of the vehicle superstructure relative to a vehicle axle. By switching specific valves, the air springs are filled or evacuated depending on requirement in order to adjust the vehicle ride height. Thus after loading the vehicle, a height adjustment may be performed, or the vehicle may be lowered during travel for example in order to save fuel.

There is an increasing desire to facilitate embarkation and disembarkation for vehicle occupants. This may be necessary in particular if the vehicle superstructure normally has a high position, so that vehicle occupants can get in more easily. Therefore the vehicle must be lowered when parked.

In a closed air supply system, the vehicle is lowered by discharging compressed air from the air springs into a pressure accumulator. With lowering per axle, firstly compressed air is discharged from the air springs of one axle into the pressure accumulator, and then compressed air from the air springs of the other axle is discharged into the same pressure accumulator. Because of the pressure differences of air springs relative to the pressure accumulator, and the associated delivery power, the adjustment speed is low. Lowering per axle also causes tilting of the vehicle superstructure, which should be avoided since this is associated with a low adjustment speed.

EP 1243447 A2 relates to a closed level adjustment system which draws in air from the atmosphere/environment by means of a compressor and transfers it to a pressure accumulator or the air springs. In a particular embodiment, this level adjustment system comprises a plurality of pressure accumulators. A main accumulator is provided, and also an additional accumulator is assigned to each axle. A blocking check valve is provided in a compressed air line starting from the compressor in the direction of an additional accumulator. Furthermore, switching valves are arranged upstream of the air springs of one axle, so that via a further compressed air line, these can be filled with compressed air from the compressor or with compressed air from the additional accumulator of the same axle. In order to transfer compressed air from the air springs of an axle to the additional accumulator of the same axle, a further line with further switching valves is provided between the air springs and the additional accumulator. This line is admittedly short so that rapid lowering of the vehicle is possible, but the overall structure with a main accumulator and two additional accumulators is over-dimensioned and unnecessarily complicated by the respective supply and outlet lines of the additional accumulators.

What is needed is a way to allow an even process of adjustment of the vehicle superstructure, and to provide a simplified air suspension system with two pressure accumulators.

DETAILED DESCRIPTION OF THE DRAWINGS

Figure 1:
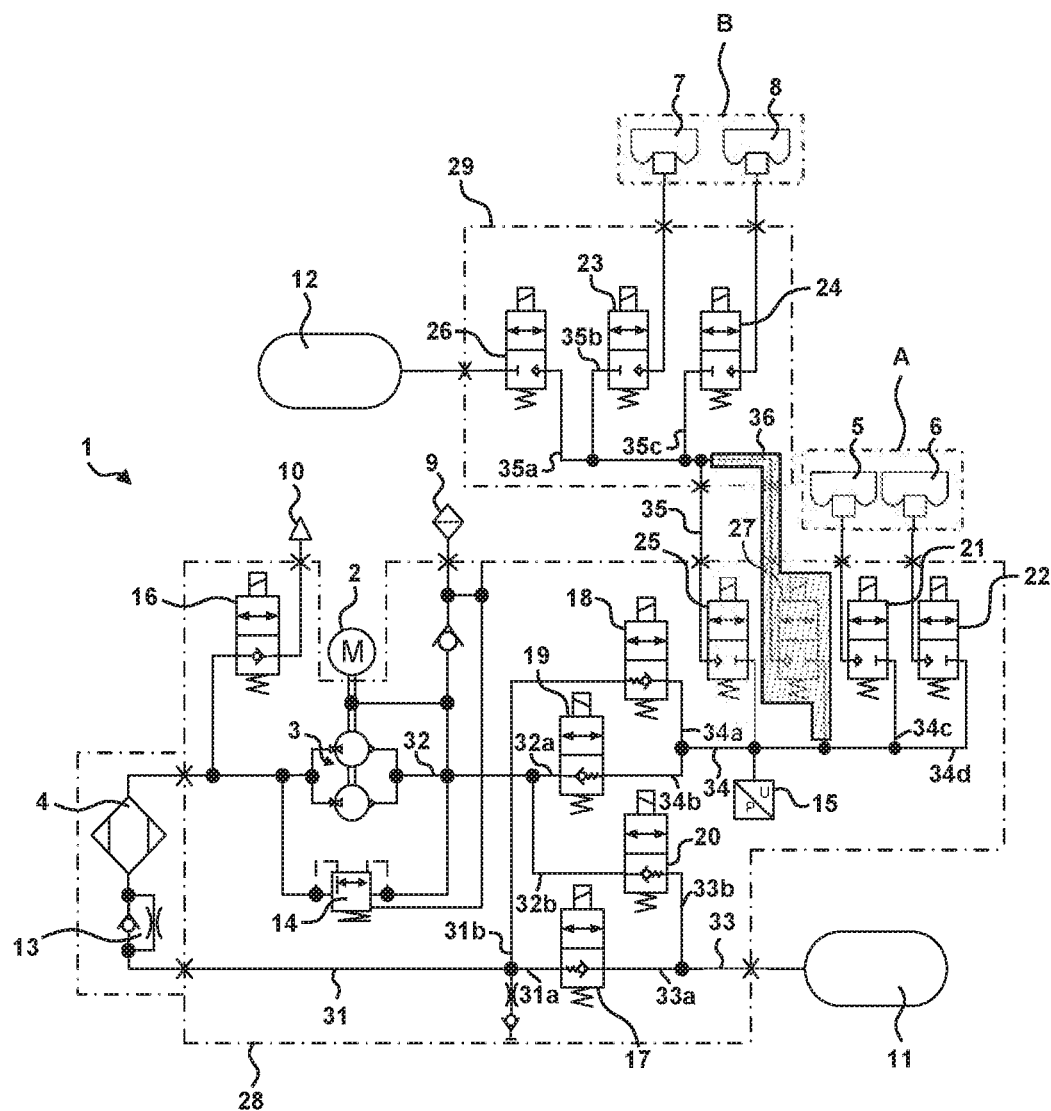
FIG. 1 shows a first pneumatic circuit diagram of an exemplary air suspension system in the starting state.

The disclosure relates to a method for operating an electronically controllable air suspension system of a motor vehicle, comprising: a plurality of air springs, by means of which a ride height of the motor vehicle can be changed by the supply and extraction of compressed air, wherein at least two of the air springs are assigned to a first axle of the motor vehicle, and wherein two further air springs are assigned to a second axle of the motor vehicle, wherein an air spring valve is connected upstream of each air spring, a compressed air supply unit which provides compressed air by aspiration of surrounding air or compression of system air, a main accumulator and an additional accumulator which are configured to store the system air,
wherein the air springs of the first axle are connected to the main accumulator via a first compressed air path, and a first and a further changeover valve are arranged in this compressed air path, wherein the air springs of the second axle are connected to the additional accumulator via a second compressed air path and an additional accumulator valve is provided in this compressed air path, wherein the second compressed air path is connected to the first compressed air path via a third compressed air path in which a connecting valve is provided, wherein for simultaneous adjustment of the ride height of the vehicle on both axles, the air spring valves, and the first and the further changeover valves and the additional accumulator valve are opened while the connecting valve remains closed.

The method provides that a compressed air path leads in each case from the air springs of an axle to an accumulator assigned to this axle. The compressed air path of the one axle is kept pneumatically separated from the compressed air path of the other axle. This allows the air springs of the first axle to be connected only to the main accumulator, and the air springs of the second axle to be connected only to the additional accumulator.

On a corresponding pressure difference between the connected chambers (air springs and accumulator), the pressure in the chambers balances or equals out. Because of a pressure difference in the compressed air between the air springs of the first axle and the main accumulator, a pressure balance or pressure exchange of compressed air takes place via the first compressed air path. At the same time, because of a pressure difference in the compressed air between the air springs of the second axle and the additional accumulator, a pressure balance or pressure exchange of compressed air takes place via the second compressed air path.

Due to the simultaneous opening of the compressed air paths, a simultaneous adjustment of the ride height takes place on both axles of the vehicle. An adjustment process takes place on each axle individually, which leads to an adjustment of the ride height of the vehicle superstructure on this axle. Because however a pressure balance takes place on both axles simultaneously, the adjustment of the ride height of the vehicle superstructure is even on both axles. Advantageously, the adjustment speed for reaching the desired target ride height is substantially increased. At the same time, the vehicle superstructure is adjusted on both axles in parallel.

A compressed air path is the pneumatic connection of a component of the air suspension system to other components of this air suspension system. A compressed air path may be implemented by a single compressed air line, or by several compressed air lines connected in series. In this case, one or more switching valves are provided in a compressed air path. Also, a compressed air line constitutes the direct pneumatic connection of one component to another component of the air suspension system, wherein a compressed air line may comprise several line portions which branch off to distributed components.

In order to lower the ride height simultaneously, at least a pressure which is lower in the additional accumulator than in the air springs of the second axle is required. The pressure in the main accumulator may be the same as, lower than or higher than the pressure in the air springs. If the pressure in the main accumulator is lower than in the air springs, the compressed air overflows, to the exclusion of the compressed air supply unit. If however the pressure in the main accumulator is higher than in the air springs, the compressed air supply unit must be operated in order to fill the pressure accumulator. Thus a simultaneous lowering process occurs on both axles of the vehicle, wherein the vehicle superstructure is lowered evenly on both axles, avoiding rocking.

This applies similarly for lowering the ride height on both axles at the same time. Only a pressure which is lower in the additional accumulator than in the air springs of the second axle is required. The pressure difference between the main accumulator and the air springs of the first axle. A simultaneous raising process occurs on both axles of the vehicle, wherein the vehicle superstructure is raised evenly on both axles, avoiding rocking.

In one or more embodiments, a pressure difference of the main accumulator relative to the air springs of the first axle, or of the additional accumulator relative to the air springs of the second axle, is built up in that, in a previous adjustment process, the system air is compressed by the compressed air supply device and conveyed for example into the main accumulator, so that a higher pressure level prevails in the main accumulator than in the air springs of the first axle. This applies similarly for the additional accumulator. Also, a preceding adjustment process may bring the pressure in the air springs to a higher pressure level than in their respective accumulators. However, it may also occur that an adequate pressure difference is already present because the level of the vehicle superstructure was already raised for example in a preceding adjustment process, so that a higher pressure prevails in the air springs.

According to one or more embodiments, to adjust the ride height of the vehicle on the first axle, the compressed air supply unit, which is situated in the first compressed air path, is switched on. As soon as the pressure has partially balanced between the air springs of the first axle and the main accumulator, the adjustment speed diminishes. In order to accelerate this, it is helpful to switch on the compressed air supply unit so that the balancing process is accelerated.

According to one or more embodiments, adjustment of the ride height of the vehicle on both axles is ended by closure of the air spring valves and of the first and second changeover valves and of the additional accumulator valve. By closing these valves or the first and second compressed air path, adjustment of the ride height is ended. This may also take place prematurely, i.e. before a complete pressure balance has been reached between the chambers of the first and second compressed air path.

According to one or more embodiments, the pressure in the main accumulator or in the additional accumulator or in the air springs is determined by means of a pressure sensor. This serves to determine the pressure difference of the air springs relative to the assigned accumulator in order for the control unit to be able to determine the possibility for adjustment and calculate the associated speed.

According to one or more embodiments, also an air suspension system of a motor vehicle is provided, comprising:

a plurality of air springs, by means of which a ride height of the motor vehicle can be changed by the supply and extraction of compressed air, wherein at least two of the air springs are assigned to a first axle of the motor vehicle, and at least two further air springs are assigned to a second axle of the motor vehicle, wherein an air spring valve is connected upstream of each air spring, a compressed air supply unit which provides compressed air by aspiration of surrounding air or compression of system air, a main accumulator and an additional accumulator which are configured to store the system air, wherein on the output side of the compressed air supply unit, a first compressed air line leads to a first and to a second changeover valve, wherein on the input side of the compressed air supply unit, a second compressed air line leads to a third and to a fourth changeover valve, wherein a third compressed air line leads from the main accumulator to the first and to the fourth changeover valves, wherein a first connecting valve is provided which is arranged between a fourth compressed air line and a fifth compressed air line, wherein the fourth compressed air line leads from the connecting valve to the second and to the third changeover valves, and the fifth compressed air line leads from the connecting valve to an additional accumulator valve which is connected upstream of the additional accumulator, wherein the air spring valves of the air springs of the second axle are connected to the fifth compressed air line.

According to this pneumatic arrangement of the air suspension system, the four changeover valves constitute a changeover valve device, by means of which the input side and output side of the compressed air supply unit are connected to the air springs and the main accumulator. This embodiment of the changeover valve device with four 2/2-way directional control valves allows various compressed air paths to be established between the air springs, the compressed air supply unit and the main accumulator, in order to undertake any adjustment processes. In particular, the main accumulator is available for adjustment processes or an exchange of compressed air with the air springs of the first axle. The corresponding compressed air path is opened by opening the first and third changeover valves.

In one or more embodiments, at least four changeover valves and the air spring valves of the air springs of the first axle are structurally combined into a first valve block.

Also, with this air suspension system, a second valve block is provided, wherein at least the air spring valves of the second axle and the additional accumulator valve of the additional accumulator are structurally combined.

The first and the second valve blocks are connected together pneumatically by means of a connecting line, wherein a switching valve is provided in this line as a 2/2 way valve. Via this connecting line, it is possible to supply the additional accumulator and the air springs of the second axle with compressed system air.

Because the air springs of the second axle and the additional accumulator are connected to the second valve block, they can be separated from the remainder of the system by closing the connecting line. Accordingly, a direct compressed air path can be opened between the air springs of the second axle and the additional accumulator, while no pressure connection exists to the remainder of the system. In this way, the additional accumulator is available for the air springs of the second axle.

According to one or more embodiments, the air spring valves of the first axle are connected to the fourth compressed air line.

By simultaneous opening of all air spring valves, and of the first and third changeover valves and the additional accumulator valve, while the connecting valve is closed, this circuit arrangement allows the exchange of compressed air from the air springs of a respective axle with the associated accumulator. When the pressure differences between the air springs and accumulator are correspondingly high, compressed air overflows from the chamber with the higher pressure level into the chamber with the lower pressure level. The exchange of compressed air continues until the pressure level has equalized or balanced. Also, the exchange process may be terminated prematurely by closure of the corresponding compressed air path.

The balancing of the pressure level of the chambers connected via the compressed air path causes a height adjustment of the vehicle superstructure. Because the air springs of a respective axle have their own accumulator, the adjustment process is carried out on both axles simultaneously. This leads to a significant rise in the control speed and prevents rocking of the vehicle superstructure on level adjustment.

In addition, the second changeover valve is optionally in an open switch position. It is advantageous if the second changeover valve is also moved into the open switch position, so that a balanced pressure is applied to the pistons of the compressed air supply unit. If the pistons of the compressed air supply unit are in a pressure-balanced state, safe start-up is possible and less power is consumed.

In one or more embodiments, a sixth compressed air line with a second connecting valve is provided, wherein the sixth compressed air line is coupled firstly to the fourth compressed air line and secondly to the fifth compressed air line. A further connecting line which connects the second valve block to the first valve block increases the delivery quantity and hence the adjustment speed when for example the air springs of the second axle are filled with system air.

In one or more embodiments, a pressure sensor is provided on the fourth compressed air line. In order to be able to determine the pressures in the air springs and in the accumulators, the pressure sensor is provided at a central position. With corresponding valve switching, the individual pressure levels can be determined, so that the size of the pressure difference between the air springs of the second axle and the additional accumulator for example can be established.

In one or more embodiments, the air suspension system comprises a control unit, by means of which the switching valves can be actuated electronically.

FIG. 1 shows a first pneumatic circuit diagram of an exemplary, electronically controllable air suspension system 1 which works in a closed air supply mode. This comprises a compressor 3, driven by an electric motor 2 and configured in the form of a dual piston compressor, several air springs 5 to 8, wherein the air springs 5 and 6 are assigned to a first axle A of the vehicle (e.g. the rear axle), and wherein the air springs 7 and 8 are assigned to a second axle B of the vehicle (e.g. the front axle). An air spring valve 21 to 24 is connected upstream of each air spring 5 to 8.

Also, the air suspension system 1 comprises a dryer 4 which is designed to dry the air drawn in from the environment by the compressor 3, and a choke check valve 13 connected downstream of the dryer 4. In order to store the aspirated air as system air in the air suspension system 1, a main accumulator 11 is provided. Furthermore, a changeover valve device is provided which connects together the compressor 3, main accumulator 11 and air springs 5 to 8. This changeover valve device consists of four changeover valves 17 to 20, which are configured as electronically controllable 2/2-way directional control valves.

In order to provide compressed system air, the compressor 3 draws in air from the atmosphere via an inlet 9. System air can be expelled from the air suspension system 1 via an outlet 10 which can be closed by a switchable discharge valve 16. A power-limiting valve 14 is provided bridging the compressor outlet and inlet.

On the outlet side of the compressor 3, a first compressed air line 31 leads to a first changeover valve 17 and to a second changeover valve 18. This first compressed air line 31 comprises a line portion 31a leading to the first changeover valve 17, and a further line portion 31b leading to the second changeover valve 18.

On the inlet side of the compressor 3, a second compressed air line 32 leads to a third changeover valve 19 and to a fourth changeover valve 20, while a first line portion 32 leads to the third changeover valve 19 and a further line portion 32b leads to the fourth changeover valve 20.

From the main accumulator 11, a third compressed air line 33 with a first line portion 33a leads to the first changeover valve 17, and with a further line portion 33b leads to the fourth changeover valve 20.

For example, an additional accumulator 12 is provided which is assigned to the air springs 7, 8 of the second axle B. In order to connect the additional accumulator 12 and air springs 7, 8 to the changeover valve device, a first connecting valve 25 is provided.

The first connecting valve 25 is connected firstly via a fourth compressed air line 34 to the second changeover valve 18 by the first line portion 34a, and to the third changeover valve 19 by a further line portion 34b. Secondly, the connecting valve 25 is connected via a fifth compressed air line 35 to an additional accumulator valve 26, connected upstream of the additional accumulator 12, by a first line portion 35a, and also further line portions 35b and 35c lead from the fifth compressed air line 35 to the air spring valves 23 and 24 of the air springs 7 and 8.

Furthermore, line portions 34c and 34d lead from the fourth compressed air line 34 to the air springs 21 and 22.

Alternatively, as shown in dotted lines, a further connecting line 36 may be provided which is coupled firstly to the fourth compressed air line 34 and secondly to the fifth compressed air line 35. A second connecting valve 27 is provided in this sixth compressed air line 36. This second connecting line increases the delivery speed and volume.

At least the changeover valve device comprising the valves 17 to 20, the first connecting valve 25 and the air spring valves 21, 22, are combined into a first valve block 28 as a structural unit.

The air spring valves 23, 24 and the additional accumulator valve 26 are combined into a second valve block 29 as a structural unit, which is connected to the first valve block 28 via the connecting line 35.

A control unit is provided, by means of which the switching valves can be actuated as required; this is not shown in the figure but evidently belongs to the electronically controlled air suspension system.

The control process for filling and raising the vehicle superstructure by means of the air suspension system 1 is outlined briefly below.

The closed air supply mode is distinguished in that the compressed air is shifted to and fro between the main pressure accumulator 11 and the air springs 5 to 8. For this, the compressor 3 firstly draws air in from the atmosphere via the inlet 9 and fills the main accumulator 11 with the compressed air. This takes place via the first and third compressed air lines 31, 33. For this, the electric motor 2 of the compressor 3 is actuated by the control unit and moves at least the first changeover valve 17 into an open switch position.

In order now to transfer the compressed air into the air springs 5 to 8 so that they can raise the vehicle superstructure and hence adjust the ride height, the compressed system air is transferred from the main accumulator 11 to the air springs 5 to 8 by means of the compressor 3. The third and second compressed air lines 33, 32 are used for this, wherein the fourth changeover valve 20 is opened so that the compressor 3 is supplied with system air from the main accumulator 11. This system air is then compressed and supplied via the first compressed air line 31 to the open second changeover valve 18, so that the compressed system air flows via the fourth compressed air line 34 into the air springs 5 to 8, depending on the switch position of the air spring valves 21 to 24. So that the air springs 7 and 8 can be filled, the connecting line 35 is opened by means of the first connecting valve 25. In this control process, the first and third changeover valves 17, 19 remain closed.

Figure 2:
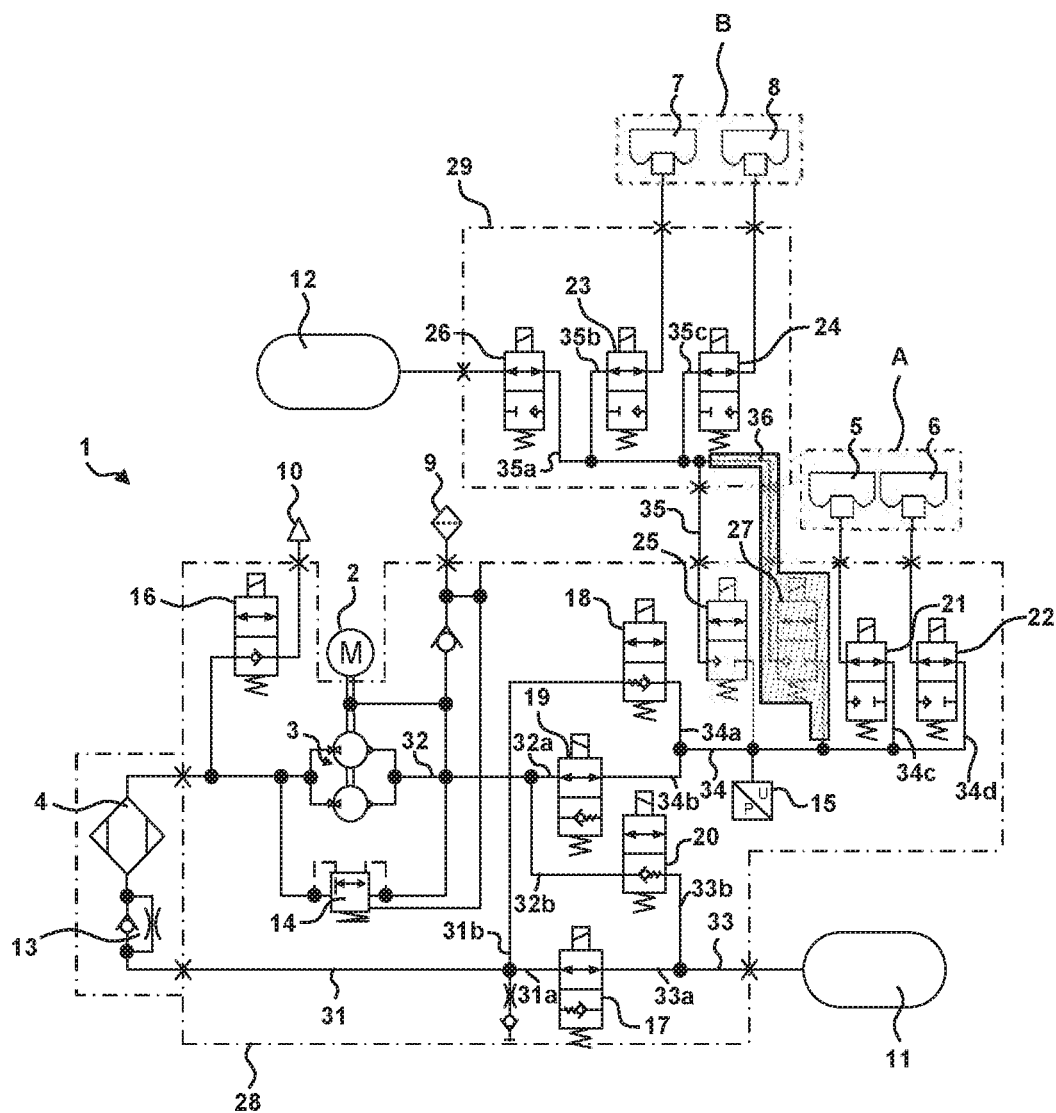
FIG. 2 shows a second pneumatic circuit diagram of an exemplary air suspension system in the adjustment state.

FIG. 2 shows the exemplary air suspension system 1 with open air spring valves 21 to 24 for implementing a control process for the vehicle superstructure.

Firstly, the control unit powers the first and second air spring valves 21, 22 so that they open. At the same time, the third changeover valve 19 is opened in order to connect the air springs 5, 6 to the compressor inlet, and the first changeover valve 17 is also opened in order to compress the compressed air from the air springs 5, 6 by means of the compressor 3 and supply this to the main accumulator 11. With this switch position and an adequate pressure difference between the air springs 5, 6 and the main accumulator 11, the air springs 5, 6 are at least partially evacuated and hence axle A is lowered. For this, a higher pressure is required in the air springs 5, 6. The lowering process continues until a pressure balance has been established between the air springs 5, 6 and the main accumulator 11. The second and fourth changeover valves 18 and 20 remain closed in this arrangement.

Alternatively, the pressure balance or air exchange between the air springs 5, 6 and the main accumulator 11 may take place in this switch position without the compressor running. Here, the compressed air flows into the compressor 3 in the same way via the fourth and second compressed air lines 34, 32, and out of the compressor 3 via the first compressed air line 31 into the main accumulator 11 without being compressed.

As soon as the pressure in the air springs 5, 6 and the main accumulator 11 has balanced, this control process may however be supported by switching on the compressor 3 so that the adjustment time is accelerated. In order to support the compressor start-up, it is useful to ensure a pressure balance in the compressor 3, i.e. with approximately the same pressure above and below the compressor pistons, a lower force is required to start the compressor 3. For this, in addition (not shown) the second changeover valve 18 is transferred to the open position so that the pressure leaving the air springs 5, 6 is applied to both sides of the compressor 3.

To lower the second axle B, the first connecting valve 25 remains closed so that no compressed air flows from the air springs 7, 8 into the first valve block 28. At the same time as in the first valve block 28, in the second valve block 29 the air spring valves 23, 24 of the air springs 7, 8 of the second axle B are opened by the control unit, and the additional accumulator valve 26 is also opened. Accordingly, the air springs 7, 8 and additional accumulator 12 are isolated from the first valve block 29, but air springs 7, 8 are connected directly to the additional accumulator 12 via the fifth compressed air line 35.

If there is an adequate pressure difference between the air springs 7, 8 and the additional accumulator 12, air overflows into the additional accumulator 12 via the opened air path of the fifth compressed air line 35. Accordingly, the second axle B is lowered at the same time as the first axle A.

An adjustment process continues until the pressure of two chambers, connected together by opening of various valves, has balanced or equalized, and the same pressure prevails in both chambers. A pressure difference sufficient for the adjustment process prevails when the pressure in one of the chambers is substantially higher than the pressure in the chamber to be filled. To ensure an adequate pressure difference, before the adjustment processes described here, further adjustment processes are necessary which ensure the pressure build-up in the respective chambers. These are for example any adjustment processes which have adjusted the ride height of the vehicle during travel or balanced the level after loading. This is usually performed by the compressor 3 which fills the individual chambers (air springs or pressure accumulators) depending on the switch position of the corresponding valves.

Thus with the switch position shown, it is also possible to achieve a raising process, i.e. to raise the vehicle superstructure. If a greater pressure prevails in the main accumulator 11 than in the air springs 5, 6 of axle A, and if a greater pressure prevails in the additional accumulator 12 than in the air springs 7, 8 of axle B, with the valve settings shown, an even raising of the vehicle superstructure may take place.

Here too, at least axle A may be supported in raising by switching on the compressor 3 for air flow from the main accumulator 11 to the air springs 5, 6. In this case, it may also be useful to open the first changeover valve 17 so that the pressure at the compressor 3 is balanced.

In order to be able to perform the control processes for simultaneous adjustment of both axles A, B of the vehicle, firstly information is required on the respective pressure in the chambers, which is detected by means of the pressure sensor 15. In addition, ride height information may be used, which is detected by means of height sensors.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

1 Air suspension system
2 Electric motor
3 Compressor
4 Filter
5 Air spring
6 Air spring
7 Air spring
8 Air spring
9 Inlet
10 Outlet
11 Main accumulator
12 Additional accumulator
13 Choke check valve
14 Power-limiting valve
15 Pressure sensor
16 Discharge valve
17 First changeover valve
18 Second changeover valve
19 Third changeover valve
20 Fourth changeover valve
21 First air spring valve
22 Second air spring valve
23 Third air spring valve
24 Fourth air spring valve
25 First connecting valve
26 Additional accumulator valve
27 Second connecting valve
28 First valve block
29 Second valve block
31 First compressed air line
32 Second compressed air line
33 Third compressed air line
34 Fourth compressed air line
35 Fifth compressed air line
36 Sixth compressed air line

The invention claimed is:

1. A system for operating an electronically controllable pneumatic suspension system of a motor vehicle, comprising:
a plurality of air springs by which a ride height of the motor vehicle can be changed by the supply and extraction of compressed air, wherein at least two of the air springs are assigned to a first axle of the motor vehicle, and wherein two further air springs are assigned to a second axle of the motor vehicle, wherein an air spring valve is connected upstream of each air spring;
a compressed air supply unit which provides compressed air by aspiration of surrounding air or compression of system air;
a main accumulator and an additional accumulator which are configured to store the system air; and
wherein the air springs of the first axle are connected to the main accumulator via a first compressed air path, and a first and a further changeover valves are arranged in the first compressed air path, wherein the air springs of the second axle are connected to the additional accumulator via a second compressed air path and an additional accumulator valve is provided in the second compressed air path, wherein the second compressed air path is connected to the first compressed air path via a third compressed air path in which a connecting valve is provided, wherein for simultaneous adjustment of the ride height of the vehicle on both axles, the air spring valves, and the first and the further changeover valves and the additional accumulator valve are opened while the connecting valve remains closed.

2. The system as claimed in claim 1, wherein to adjust the ride height of the vehicle on the first axle, the compressed air supply unit which is situated in the first compressed air path is switched on.

3. The system as claimed in claim 1, wherein adjustment of the ride height of the vehicle on both axles is ended by closure of the air spring valves and of the first and second changeover valves and of the additional accumulator valve.

4. The system as claimed in claim 1, wherein the pressure in the main accumulator or in the additional accumulator or in the air springs is determined by a pressure sensor.

5. The system as claimed in claim 1, wherein a pressure exchange of compressed air takes place via the second compressed air path when there is a pressure difference in the compressed air between the air springs of the second axle and the additional accumulator.

6. The system as claimed in claim 1, wherein a pressure exchange of compressed air takes place via the first compressed air path when there is a pressure difference in the compressed air between the air springs of the first axle and the main accumulator.

7. An air suspension system of a motor vehicle, comprising:
a plurality of air springs by which a ride height of the motor vehicle can be changed by the supply and extraction of compressed air, wherein at least two of the air springs are assigned to a first axle of the motor vehicle, and at least two further air springs are assigned to a second axle of the motor vehicle, wherein an air spring valve is connected upstream of each air spring;
a compressed air supply unit which provides compressed air by aspiration of surrounding air or compression of system air;
a main accumulator and an additional accumulator which are configured to store the system air; and
wherein on an output side of the compressed air supply unit, a first compressed air line leads to a first changeover valve and to a second changeover valve, wherein on an input side of the compressed air supply unit, a second compressed air line leads to a third changeover valve and to a fourth changeover valve, wherein a third compressed air line leads from the main accumulator to the first and to the fourth changeover valves, wherein a first connecting valve is provided which is arranged between a fourth compressed air line and a fifth compressed air line, wherein the fourth compressed air line leads from the connecting valve to the second and to the third changeover valves, and the fifth compressed air line leads from the connecting valve to an additional accumulator valve which is connected upstream of the additional accumulator, wherein the air spring valves of the air springs of the second axle are connected to the fifth compressed air line.

8. The air suspension system as claimed in claim 7, wherein the air spring valves of the first axle are connected to the fourth compressed air line.

9. The air suspension system as claimed in claim 7, wherein a sixth compressed air line with a second connecting valve is provided, wherein the sixth compressed air line is coupled firstly to the fourth compressed air line and secondly to the fifth compressed air line.

10. The air suspension system as claimed in claim 7, wherein a pressure sensor is provided on the fourth compressed air line.

11. The air suspension system as claimed in claim 7, wherein a pressure exchange of compressed air takes place via the second compressed air path when there is a pressure difference in the compressed air between the air springs of the second axle and the additional accumulator.

12. The air suspension system as claimed in claim 7, wherein a pressure exchange of compressed air takes place via the first compressed air path when there is a pressure difference in the compressed air between the air springs of the first axle and the main accumulator.

* * * * *